United States Patent [19]
Mattison et al.

[11] Patent Number: 5,325,241
[45] Date of Patent: Jun. 28, 1994

[54] WRITE PRECOMPENSATION WITH FREQUENCY SYNTHESIZER

[75] Inventors: Rodney A. L. Mattison, Louisville; David E. Norton, Jr., Boulder, both of Colo.

[73] Assignee: Fujitsu Limited, Kanagawa, Japan

[21] Appl. No.: 715,616

[22] Filed: Jun. 14, 1991

[51] Int. Cl.$^5$ .............................................. G11B 5/09
[52] U.S. Cl. .................................... 360/45; 360/46; 360/51; 360/53; 307/511; 307/516; 307/527; 328/155
[58] Field of Search ................... 360/45, 46, 51, 31, 360/53; 307/511, 516, 527; 328/155

[56] References Cited

U.S. PATENT DOCUMENTS

| | | | |
|---|---|---|---|
| 4,173,027 | 10/1979 | Rathbun | 360/45 |
| 4,245,263 | 1/1981 | Rathbun et al. | 360/45 |
| 4,334,250 | 6/1982 | Theus | 360/45 |
| 4,481,549 | 11/1984 | Theus | 360/45 |
| 4,691,254 | 9/1987 | Cloke | 360/45 |
| 4,809,088 | 2/1989 | Lofgren et al. | 360/31 |
| 4,851,932 | 7/1989 | Scheer et al. | 360/51 |
| 4,922,141 | 5/1990 | Lofgren et al. | 307/511 |
| 5,187,615 | 2/1993 | Miyazawa | 360/51 |

Primary Examiner—Robert J. Pascal
Assistant Examiner—R. A. Ratliff
Attorney, Agent, or Firm—Curtis, Morris & Safford

[57] ABSTRACT

A write precompensation circuit employs a frequency synthesizer for providing a variable timing signal linked to variable transfer rate in a track zone recording system of a disk drive. The synthesizer also provides an operating frequency current sense signal that is used to generate bit shift of data bits being recorded. A ramp voltage on a ramp capacitor and a logic signal from a bit shift decision circuit are determinative of the magnitude and direction of bit shift, early or late. The VCO and its capacitor are formed on the same IC chip as the ramp capacitor thereby minimizing mismatch due to tolerances inherent in production and operation of electrical components.

11 Claims, 4 Drawing Sheets

EXAMPLE OF 1 0 1 0 0 PATTERN

| BIT PATTERN | COMPENSATION | SELECT |
|---|---|---|
| 1 0 1 0 0 | SHIFT TO THE LEFT | X 2 |
| 1 0 1 0 1 | DO NOT SHIFT | X 1 |
| 0 0 1 0 1 | SHIFT TO THE RIGHT | X 0 |
| 0 0 1 0 0 | DO NOT SHIFT | X 1 |
| ↑ COMPENSATED BIT | | |

WRITE PRECOMPENSATION WITH FREQUENCY SYNTHESIZER

FIELD OF THE INVENTION

This invention relates to a write precompensation circuit useful for recording binary data in a magnetic recording system.

BACKGROUND OF THE INVENTION

Description of the Prior Art

In presently known data processing systems, recording of digital data is accomplished by registering binary data bits or pulses on magnetic media, such as magnetic disks. The digital data is encoded with clock or timing signals that establish windows or periods during which transitions or flux reversals representing data occur. In systems that process high density data, the bits are closely packed on the magnetic disk and are subject to interference effects and undesirable peak shift during the recording process. The write pulses may shift in phase and frequency depending upon the pattern of the coded binary bits. As a result, data readout may not be accurate if bit shift is sufficient to adversely affect the phase and frequency of the data signal being recorded.

To compensate for peak shift, write precompensation has been used during the recording mode to shift the write pulses, which in effect shifts the position or phase of the data bits, as they are being recorded on the magnetic disk. The precompensation causes selected bits to shift position with reference to the clock or timing signal so that the selected bits are recorded early or late relative to the center of the timing window. In this way, the anticipated shift of the write pulse, which occurs as a result of crowding of high density data coded in certain bit patterns, is effectively compensated and cancelled by the amount of shift provided by precompensation as the write pulses are being registered on the magnetic medium. In disk drive systems that use a constant transfer rate, it is known that the flux change spacing is greater at the inner radius than the outer radius of the disk surface. Designers of disk drive systems have accordingly changed the transfer rate radially across the disk in order to maintain a constant flux change spacing so that a greater transfer rate is obtained at the outer radius than at the inner radius. Therefore, for the purpose of data processing, concentric data tracks on the surface of the disk are arbitrarily divided into radial zones, typically three zones for example. By virtue of this approach of maintaining a constant flux change spacing, storage capacity of the disk surface is maximized.

Bit shift will differ for different transfer rates and track zones because changing the transfer rate implies recording at different radial locations on the disk surface. The physics associated with the recording process is different for different radial locations on the disk surface. One example is that the tangential velocity of the head-to-disk interface is greatest at the outermost or largest radial track.

To solve the problem of bit shift, different approaches to write precompensation have been provided. The magnitude of write precompensation in a track zone recording system is generally controlled by switching in different currents, voltages or resistances. Generally a voltage controlled oscillator (VCO) is used to control the operating frequency of the recording system. The VCO, which includes a capacitive element, is controlled to provide a constant frequency output signal. The VCO must be precisely controlled and the VCO capacitor needs to be matched to other capacitive elements and components of the write frequency precompensation circuit. It would be highly desirable to provide a precompensation circuit and associated circuitry on an integral semiconductor chip on which an integrated circuit is formed.

SUMMARY OF THE INVENTION

An object of this invention is to provide a write precompensation circuit wherein variable precompensation is linked to variable transfer rate.

Another object of this invention is to provide an integrated circuit which requires less circuit components than prior known data recording systems for implementing write precompensation.

In accordance with this invention, a write precompensation system includes a frequency synthesizer that provides a different operating frequency for each of the arbitrarily defined track zones of recorded data on a magnetic disk. The frequency synthesizer includes a VCO disposed in a phase locked loop (PLL). A second closed loop for controlling current to the VCO is coupled to the PLL and comprises a window comparator, a digital-to-analog converter (DAC) and a source of reference current. In operation, the operating frequency output from the VCO is tied and slaved to a control current received from the reference current source and applied to the VCO. A mirrored current, which is symmetrical to the control current supplied by the current source to the VCO, is applied to a ramp capacitor in the write precompensation circuit. The ramp voltage appearing on the ramp capacitor is compared to a reference voltage by a comparator network which passes select signals to a selector. A bit shift decision circuit including combinatorial logic, in response to the coded data, signals the selector to select a shift signal that will provide the necessary write precompensation to the write pulse being recorded. The magnitude of precompensation is varied as a function of write head position and track zone and thus the variable transfer rate.

In accordance with this invention, the ramp capacitor and the VCO capacitor are formed on the same integrated semiconductor chip, which may be produced by large scale integration. During operation of the system, the circuit components formed on the chip are affected to the same degree by electrical circuit effects. In this way, a constant ratio and proper match of the onboard capacitors, including the VCO and ramp capacitors, are maintained. By virtue of this invention, the number of external components and input-output elements are significantly reduced.

The write precompensation circuit disclosed herein links the variable precompensation to the variable transfer rate. The write precompensation circuit predicts the effects of bit shift when binary data is recorded and compensates for bit shift by changing the point in time or phase when the write current changes polarity within the write head.

BRIEF DESCRIPTION OF THE DRAWINGS

The invention will be described in detail with reference to the drawings in which.

DESCRIPTION OF THE PREFERRED EMBODIMENT

Figure 1:
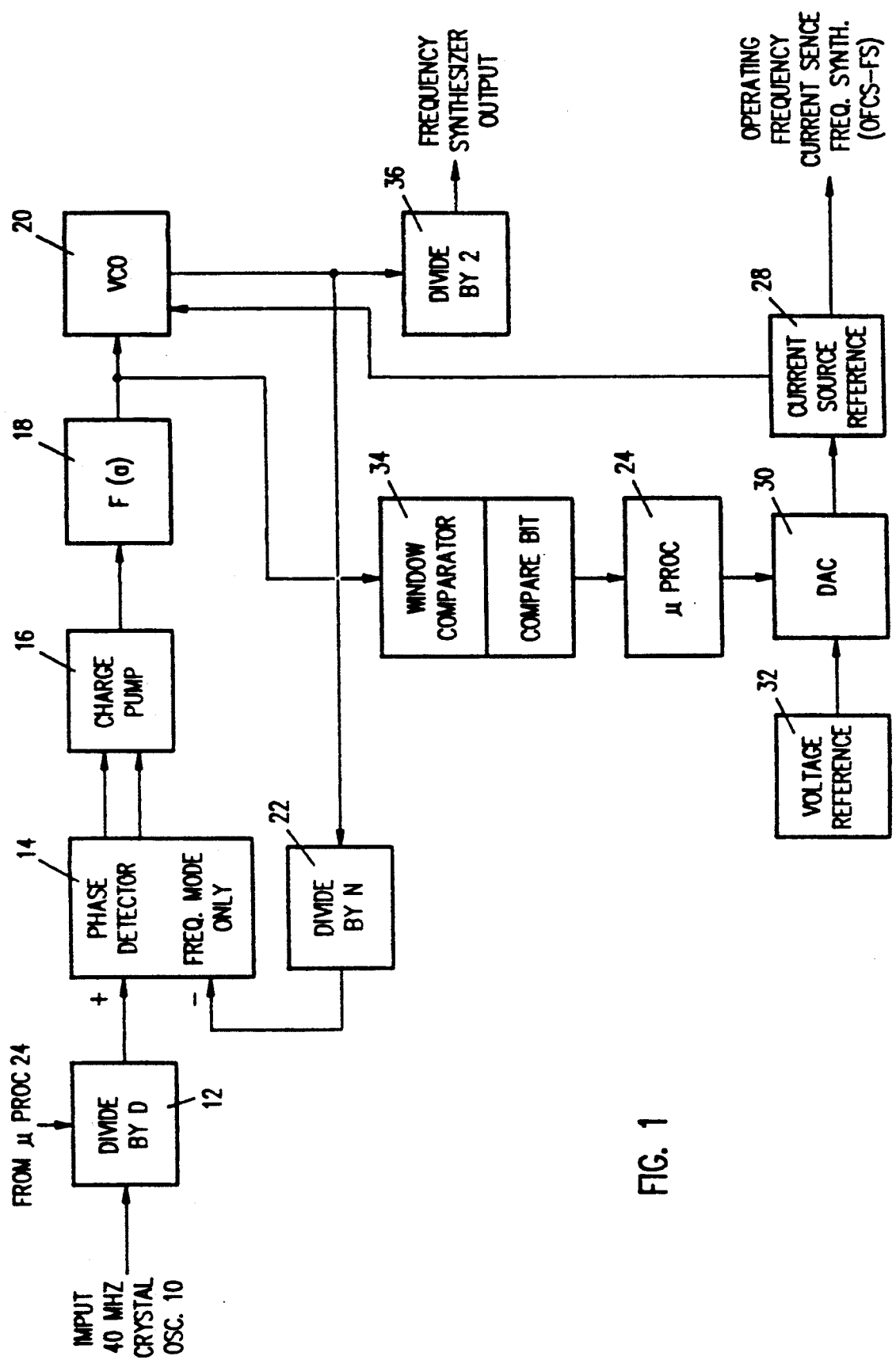
FIG. 1 is a block diagram of the frequency synthesizer, made in accordance with this invention.
Figure 4:
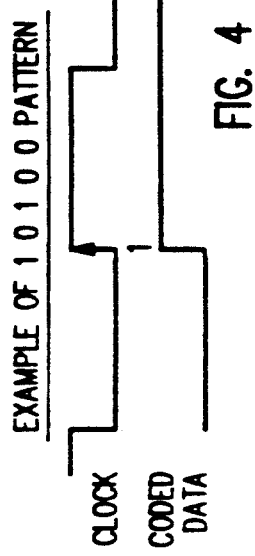
FIG. 4 illustrates a clock waveform and an exemplary waveform of a binary bit pattern 10100.

With reference to FIG. 1., a frequency synthesizer 20 includes a crystal oscillator 10 that provides a timing signal or clock to a programmable divider 12. The oscillator 10 produces a 40 MHz square wave signal, by way of example, which is used in the data processing system as a timing reference. The divide by 2 circuit 36 produces a clock signal (FIG. 4) that establishes the window during which a transition or flux reversal representing a data bit occurs. The frequency of the clock signal is controlled by a phase locked loop (PLL) which includes a phase detector 14, charge pump 16, filter 18, VCO 20 and programmable divider circuit 22 all connected in a closed feedback loop. The divide by N circuit 22 at the output of the VCO 20 controls the numerator integer and the divider 12 controls the denominator integer used in frequency synthesizer scaling.

The phase detector 14 compares the internal loop frequency to the output from the divider 12. Since the output from the divider 12 is a continuous carrier, the phase detector 14 operates in a frequency mode only. The phase detector 14 is a D type flip-flop, edge compare phase detector. The phase detector output is fed to the charge pump 16 which sources a control current to the PLL filter 18 during the time that the phase detector 14 senses a phase error. The filter 18 serves as an impedance that converts current to voltage and fine tunes and controls the operating frequency of the VCO and the PLL by means of the closed servo loop action of the PLL.

The VCO 20 is an astable multivibrator having a capacitor 26 (see FIG. 3) that is internal to the integrated circuit. The VCO operating frequency is controlled by the output from a current source reference 28 and the output from the filter 18. A digital-to-analog converter (DAC) 30 that includes a control register controls the current source reference 28 and produces a coarse adjustment of the VCO operating frequency. A voltage source 32 provides a reference voltage to the DAC 30.

Figure 2:
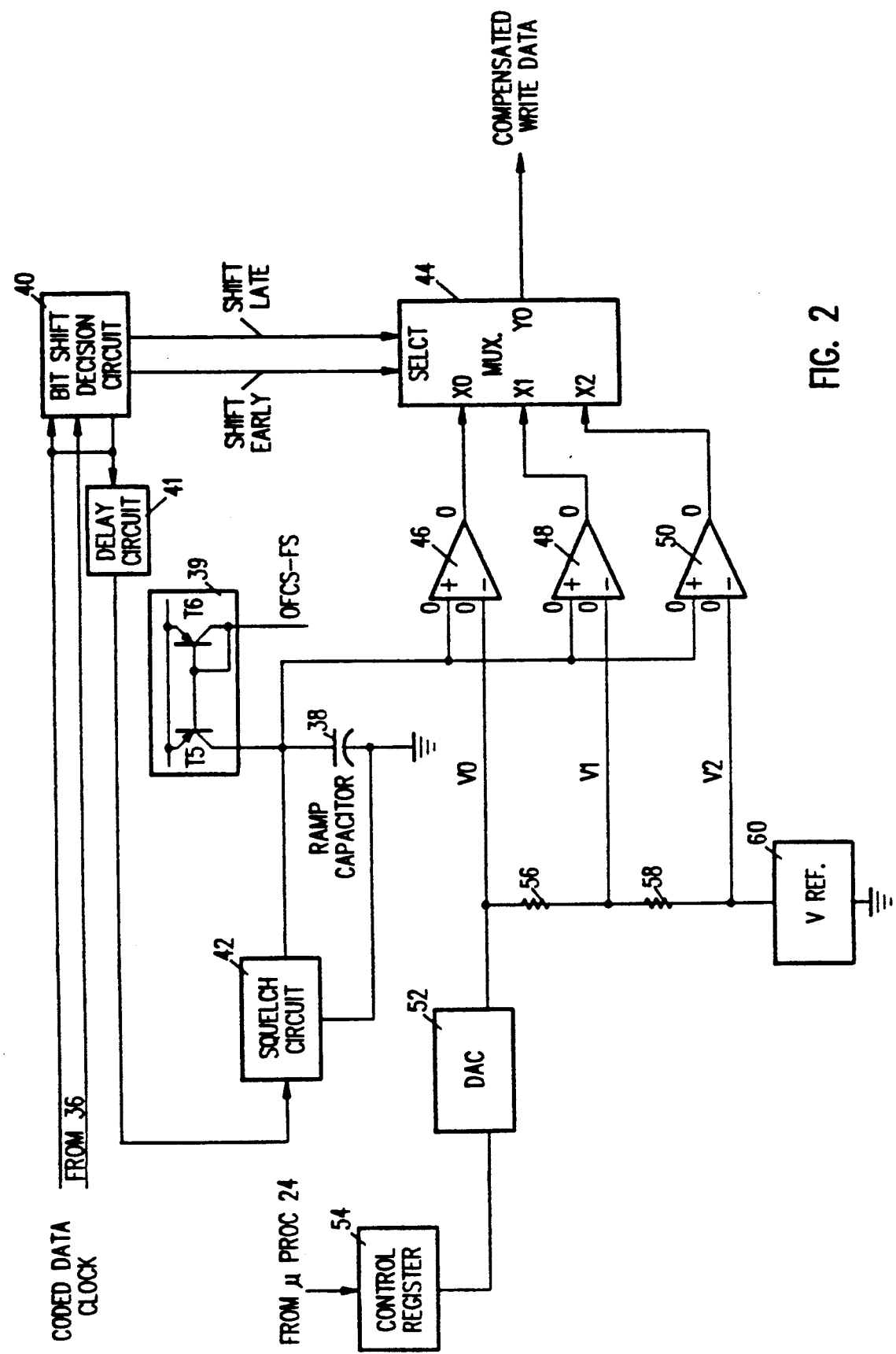
FIG. 2 is a block diagram of a write precompensation circuit, which employs the frequency synthesizer of FIG. 1.

During power up, a window comparator 34 senses the voltage from filter 18 that is applied to the input of the VCO 20. If the voltage is outside of a predetermined window, a compare bit indicative of this condition is generated. The compare bit is fed to the microprocessor 24 which signals the DAC 30 to modify and adjust the level of current provided from the current source reference 28 to the VCO 20. The nominal operating frequency output of the VCO 20 is directed to a divider circuit 36, which is a flip-flop that divides by 2 and operates with a 50% duty cycle. The divider circuit 36 produces a controlled and adjusted clock signal for use by the write compensation circuit (FIG. 2). The output of the current source reference circuit 28 is a mirrored current, designated as an operating frequency current sense (OFCS), that is directed to a ramp capacitor 38 of the write precompensation circuit. The OFCS is dependent upon the track zone where write operation is performed, and the magnitude of precompensation is inversely proportional to the OFCS signal that is applied to a mirroring circuit 39 (FIG. 2). The control loop including the window comparator 34, the DAC 30 and the source reference 32 effectively compensates for phase and frequency displacements of the operating frequency of the VCO 20 due to inherent problems with the integrated VCO capacitor and other chip characteristics.

During the write mode of operation, the microprocessor 24 receives a signal that indicates in which track zone the magnetic head is recording and causes the operating frequency to change and thus the data transfer rate to vary accordingly. The microprocessor 24 employs an algorithm to implement the modification of the nominal operating frequency of the VCO, and runs the algorithm and stores the DAC control words for each data track zone upon power up.

Figure 5:
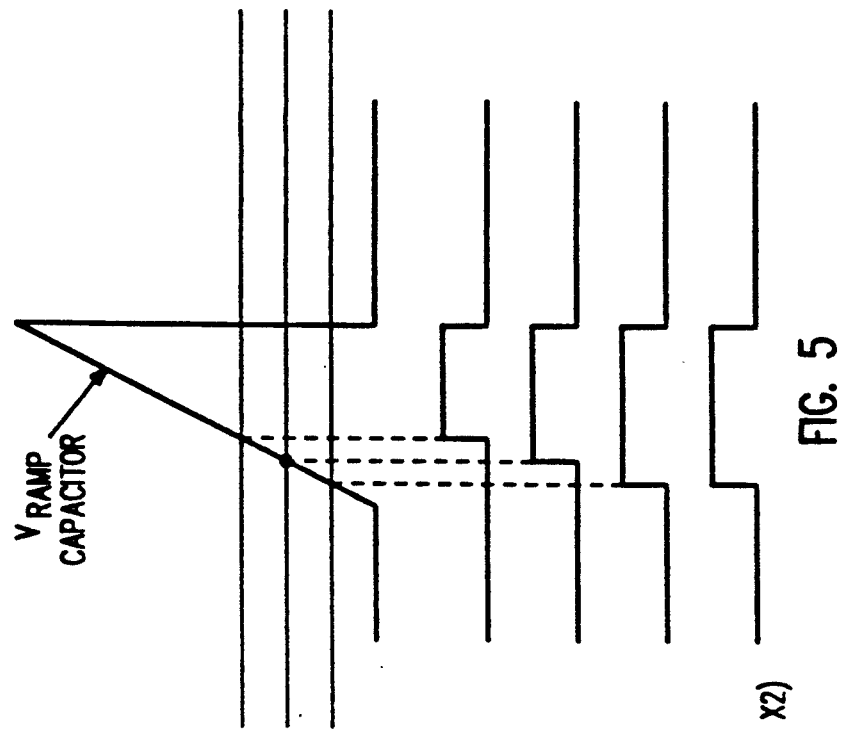
FIG. 5 shows changes in voltage on a ramp capacitor which serves in the selection process of shifting the write pulses early or late.

During operation of the write precompensation circuit illustrated in FIG. 2, coded data is applied serially to a squelch circuit 42 that produces a ramp voltage on the ramp capacitor 38 relative to ground potential whenever the data pulse is high or a binary 1, as shown in FIG. 5. The coded data is delayed, for example by a 3 bit delay circuit 41, interposed between the coded data source and the squelch circuit. The squelch circuit 42 acts as a switch that is controlled by the data pulses. When the capacitor 38 is not squelched, the operating frequency current sense of the frequency synthesizer (OFCS-FS) is mirrored in mirroring circuit 39 and charges the ramp capacitor 38. Mirroring circuit 39, which receives the OFCS current signal from the frequency synthesizer, includes two like PNP transistors T5 and T6 having common connected bases and emitters. The required magnitude of precompensation is inversely proportional to the OFCS-FS output signal, which is dependent upon the track zone in which the magnetic head is recording.

Figures 6, 7:
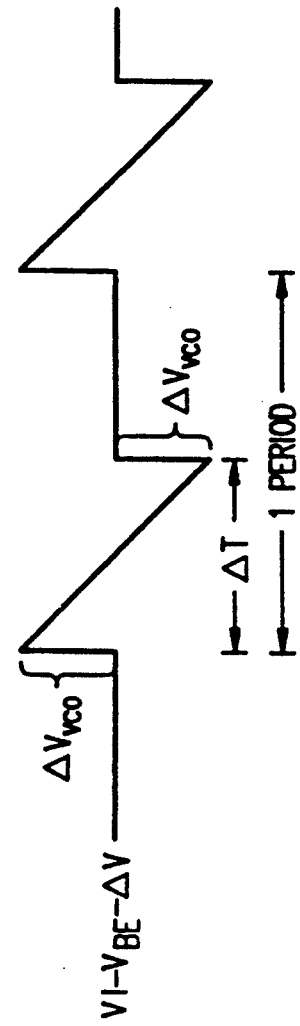
FIG. 6 is a tabular representation of different recorded 5-bit patterns and the precompensation to be provided for each pattern during recording.
FIG. 7 shows a sawtooth waveform illustrating the voltage seen at the emitter of transistor T2 in FIG. 3.

The voltage on the ramp capacitor 38 is compared to three voltage levels $V_0$, $V_1$ and $V_2$ supplied respectively to comparators 46, 48 and 50 by a digital-to-analog converter 52. The DAC 52 receives the voltage signals from a control register 54 that is coupled through a system bus to the microprocessor 24. Comparison of the voltage signals from the DAC 52 to the linear ramp voltage on the capacitor 38 causes a selective time delay $X_0$ or $X_2$, shift early or shift late, or no delay $X_1$ of the data bit to be recorded, depending upon the binary bit pattern, as illustrated in FIG. 6. In this implementation, the voltage point at which a comparator 46, 48, 50 switches will be close to the same value for each of the track recording zones. This is significant because in a five volt only system, for example, the voltage swing is limited.

In this embodiment of the invention, run length limited (RLL) data using a 1,7 code is clocked to a bit shift decision circuit 40 comprising combinatorial logic and a shift register. In the present implementation, groups of five data bits are stored in the register and processed, as illustrated in FIG. 5, although patterns having a different number of data bits may be processed in the register. The data bit to be recorded, and compensated if necessary, is preferably at the center of the bit pattern. The decision circuit 40 by means of its combinatorial logic predicts the effects of peak shift upon the center data bit stored in its shift register. The output of the decision circuit 40 controls a select multiplexer 44 that selects the appropriate time delay from one of three comparators 46,48,50. The bit patterns shown in FIG. 6 that correspond to the bit shifts $X_0$ and $X_2$ are 00101 and 10100 respectively. If the bit is not to be shifted, as occurs with a bit pattern 10101 or 00100, then no precompensation is provided. After operating on the bit to be recorded, incoming write data pulses are shifted serially into the register in a well-known manner to be processed by the precompensation circuit.

Figure 3:
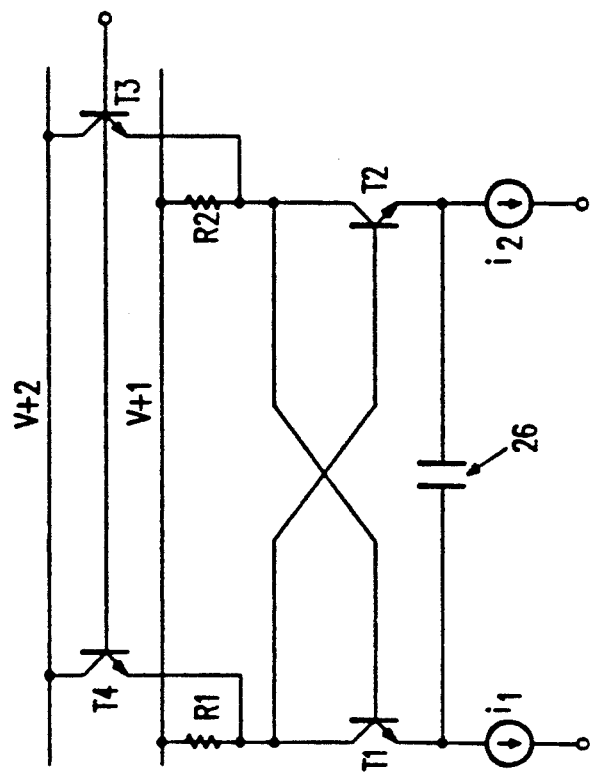
FIG. 3 is a schematic circuit diagram of a typical VCO, such as may be used in the frequency synthesizer of FIG. 1.

One version of the VCO 20 is shown in FIG. 3 by way of example. The VCO 20 includes two similar branches that alternately conduct. The first branch includes resistor R1, transistors T1 and T4 and current source $i_1$, wheras the second branch included resistor R2, transistors T2 and T3, and current source $i_2$. The base electrodes of T3 and T4 are tied and the emitters of T1 and T2 are common and have a capacitor 26 connected therebetween. Positive voltage supply V1 is connected to one end of each resistor R1 and R2 and a second positive voltage supply V2 is connected to the collectors of transistors T3 and T4. The other end of each resistor R1 and R2 is connected to the base of T2 and T1 respectively. When T2 conducts, there is a voltage drop across R2, which is determined by the base-to-emitter voltage of T3. It should be understood that the invention is not limited to this particular configuration of a VCO which is given as an example.

The effectiveness of the frequency synthesizer used with the write precompensation circuit of this invention is shown by reference to the following equations:

Defining the frequency of oscillation of the crystal oscillator 10 as $F_{xtal}$, then the frequency of oscillation of the VCO 20 is $F_{FS}$, where $F_{FS} = N/D \, F_{xtal}$. N and D are the resultants obtained from digital divider circuits. For example, in the present implementation, N may equal 8 and D may be 2, thus resulting in a frequency increase of 4.

With reference to FIGS. 3 and 7, the voltage at the emitter of T2 is defined as $V1 - V_{BE} - \Delta V$. The sawtooth voltage due to currents I1 and I2 is charging and discharging the capacitor 26. The voltage and current relationship for a capacitor is $I = C \, dV_c/dt$ which can be expressed as $I = C \, \Delta V_c / \Delta T$. Let $\Delta V_c = 2 \, V_{vco}$, where $\Delta V_{vco}$ is the voltage between the emitters of T4,T3 and V1.

Let $I = I1 = I2 = I_{Ofcs}/2$, and $C_{vco}$ be the capacitor 26, then $\Delta T = C_{vco} \, 2\Delta V_{vco} \cdot 2/I_{Ofcs}$. The frequency of operation $F_{FS} = \frac{1}{2}\Delta T = I_{Ofcs}/8C_{vco}\Delta V_{vco}$.

Thus $I_{Ofcs}/8 \, C_{vco} \, \Delta V_{vco} = F_{FS} = N/D \cdot F_{xtal}$.

The precompensation time can be computed as follows:

Let $I_R$ be the current through the ramp capacitor $C_R$ 38, and define $t_p$ as the time required for the voltage on $C_R$ to go from V2 to V1, then we can conclude that $\Delta V = V1 - V2$. Substituting in equation $I = C \, \Delta V/\Delta t$, we derive $I_R = C_R (V1-V2)/t_p$ or $t_p = C_R (V1-V2)/I_R$.

As the design is preferably implemented in a monolithic process, then $I_R \propto I_{OFCS}$ and $C_R \propto C_{vco}$, and thus $t_p = C_{vco} \, \Delta V_{vco}/I_{Ofcs}$. It follows that $C_{vco} \, \Delta V_{vco}/I_{Ofcs} \propto 1/F_{FS}$, and therefore $t_p \propto 1/F_{FS}$. As a result, it is noted that there is a direct proportional relationship between variations in the oscillator voltage and the difference between V1 and V2, which may be expressed as $(V1-V2) \propto \Delta V_{vco}$.

By virtue of this invention, the write precompensation value relates to the oscillator which is used to generate the write process, and variable precompensation is linked to the variable transfer rate. The VCO capacitor and the ramp capacitor both are formed on the same IC chip and thus mismatch and tolerance problems are minimized. It should be understood that the invention is not necessarily limited to the specific parameters set forth above as examples. The write precompensation circuit disclosed herein has universal application and can be implemented in different recording systems. Also, the frequency synthesizer of this invention generates a frequency reference that can be used by the data separator and encoder/decoder of the recording system during the read mode.

What is claimed is:

1. A system for recording binary data on a magnetic disk having a plurality of data tracks divided into track zones comprising:
   a write precompensation circuit for providing a controllable precomposition signal to data bits being recorded;
   a frequency synthesizer including a phase locked loop for generating a variable timing signal and supplying the variable timing signal to said write precompensation circuit; and
   a control loop coupled to said phase locked loop for producing an operating frequency current sense signal to control the magnitude of said precompensation signal.

2. A system as in claim 1, wherein said precompensation circuit includes a bit shift decision circuit for shifting the write pulses to be recorded, said decision circuit including combinatorial logic and a shift register for storing defined groups of data bits, and means for providing coded data bits to said decision circuit for shifting said pulses to be recorded early or late.

3. A system as in claim 1, including a voltage controlled oscillator connected to said pulse locked loop and said control loop.

4. A system as in claim 3, wherein the phase locked loop of said frequency synthesizer comprises a phase detector, means for providing a timing signal of fixed frequency, a first divider coupled between said phase detector and said timing signal providing means, and a second divider coupled between the output of said voltage controlled oscillator and the input to said phase detector.

5. A system as in claim 2, wherein said oscillator includes a capacitor and said precompensation circuit includes a ramp capacitor.

6. A system as in claim 5, wherein said capacitors are formed on an integral semiconductor chip so that a constant matched ratio is maintained during recording.

7. A system as in claim 5, including a squelch circuit coupled to said ramp capacitor for switching the ramp capacitor to conduct when a data bit to be recorded occurs.

8. A system for recording binary data on a magnetic disk having a plurality of data tracks divided into track zones comprising:
   a write precompensation circuit for providing a precompensation signal to data bits being recorded;
   a frequency synthesizer including a phase locked loop for generating a variable timing signal and supplying the variable timing signal to said write precompensation circuit;

a control loop coupled to said phase locked loop for producing an operating frequency current sense signal to control the magnitude of said precompensation signal;

a voltage controlled oscillator connected to said phase locked loop and said control loop, said voltage controlled oscillator including a capacitor and said precompensation circuit including a ramp circuit; and a plurality of comparators connected to said ramp capacitor, means for applying a reference voltage to said comparators, a multiplexer coupled to receive the output signal from said comparators, and a bit decision circuit coupled to the input of said multiplexer for providing a logic signal to shift the data bit being recorded.

9. A system for recording binary data on a magnetic disk having a plurality of data tracks divided into track zones comprising:

a write precompensation circuit for providing a precompensation signal to data bits being recorded;

a frequency synthesizer including a phase locked loop for generating a variable timing signal and supplying the variable timing signal to said write precompensation circuit; and a control loop coupled to said phase locked loop for producing an operating frequency current sense signal to control the magnitude of said precompensation signal; and a voltage controlled oscillator connected to said phase locked loop and said control loop; said phase locked loop including a filter coupled to the input of said voltage controlled oscillator, and said control loop including a window comparator coupled to a junction between said filter and oscillator.

10. A system as in claim 9, wherein said control loop includes a microprocessor connected to receive a compare bit signal from said window comparator, a digital-to-analog converter connected to said microprocessor for providing a current signal in response to said compare bit signal, and a source of current reference coupled between said converter and said oscillator for varying the nominal operating frequency of said oscillator.

11. A system for recording binary data on a magnetic disk having a plurality of data tracks divided into track zones comprising:

a write precompensation circuit for providing a precompensation signal to data bits being recorded;

a frequency synthesizer including a phase locked loop for generating a variable timing signal and supplying the variable timing signal to said write precompensation circuit;

a control loop coupled to said phase locked loop for producing an operating frequency current sense signal to control the magnitude of said precompensation signal; and a mirroring circuit coupled to said frequency synthesizer for receiving said operating frequency current sense signal.

* * * * *

UNITED STATES PATENT AND TRADEMARK OFFICE
CERTIFICATE OF CORRECTION

PATENT NO. : 5,325,241
DATED : June 28, 1994
INVENTOR(S) : Rodney A.L. Mattison et al.

It is certified that error appears in the above-identified patent and that said Letters Patent is hereby corrected as shown below:

Claim 3, line 2 (column 6, line 42), change "pulse" to --phase--.

Claim 8, lines 17-18 (column 7, lines 10-11), after "ramp" change "circuit" to --capacitor--.

Signed and Sealed this

Twentieth Day of September, 1994

Attest:

BRUCE LEHMAN

Attesting Officer     Commissioner of Patents and Trademarks